(12) United States Patent
Ehlert et al.

(10) Patent No.: US 11,439,948 B2
(45) Date of Patent: Sep. 13, 2022

(54) MEMBRANE MODULE FOR MITIGATING EVAPORATIVE FUEL EMISSIONS OF AUTOMOBILES

(71) Applicant: MAHLE International GmbH, Stuttgart (DE)

(72) Inventors: Thomas Ehlert, Böblingen (DE); Achim Gommel, Weil der Stadt (DE); John Jackson, Oxford, MI (US); Simon Streng, Stuttgart (DE); Melanie Volz, Königsbach (DE)

(73) Assignee: MAHLE International GmbH, Stuttgart (DE)

( * ) Notice: Subject to any disclaimer, the term of this patent is extended or adjusted under 35 U.S.C. 154(b) by 177 days.

(21) Appl. No.: 16/706,975

(22) Filed: Dec. 9, 2019

(65) Prior Publication Data

US 2021/0170327 A1    Jun. 10, 2021

(51) Int. Cl.
| | |
|---|---|
| *B01D 53/22* | (2006.01) |
| *B01D 63/08* | (2006.01) |
| *B01D 71/70* | (2006.01) |
| B60K 15/03 | (2006.01) |
| F02M 25/08 | (2006.01) |

(52) U.S. Cl.
CPC ......... *B01D 53/227* (2013.01); *B01D 63/082* (2013.01); *B01D 71/70* (2013.01); *B01D 2053/222* (2013.01); *B01D 2313/086* (2013.01); *B60K 15/03* (2013.01); *B60K 2015/03236* (2013.01); *B60K 2015/03243* (2013.01); *F02M 25/0836* (2013.01)

(58) Field of Classification Search
CPC ........... B01D 63/082; B01D 2053/222; B01D 71/70; B01D 53/227; B01D 2313/086; B60K 2015/03243; B60K 15/03; B60K 2015/03236; F02M 25/0836
See application file for complete search history.

(56) References Cited

U.S. PATENT DOCUMENTS

| | | | | |
|---|---|---|---|---|
| 3,723,388 | A * | 3/1973 | Bell ..................... | C08G 63/672 528/173 |
| 4,108,765 | A * | 8/1978 | Lee ...................... | B01D 61/362 210/640 |
| 4,310,416 | A * | 1/1982 | Tanaka .................. | B01D 61/28 210/321.75 |
| 4,624,778 | A * | 11/1986 | Clermont ............... | B01D 61/28 210/321.72 |
| 5,354,547 | A * | 10/1994 | Rao ...................... | C10G 70/045 423/650 |
| 5,507,856 | A * | 4/1996 | Rao ...................... | B01D 71/028 95/50 |
| 5,912,048 | A * | 6/1999 | Rao ...................... | B01D 71/021 427/228 |
| 5,957,113 | A | 9/1999 | Masaki et al. | |
| 6,772,740 | B2 | 8/2004 | Kojima et al. | |

(Continued)

*Primary Examiner* — Anthony R Shumate
(74) *Attorney, Agent, or Firm* — Dickinson Wright PLLC (57) ABSTRACT

A modular structure for a mitigating evaporative fuel emissions, such as for an automobile, is described. The structure may include a plurality of frames and membranes for flowing fuel vapor and reducing the emission of hydrocarbon therefrom. The structure may include flow guides that provide a meandering flow path for both the fuel vapor and a permeate. A flow guide providing parallel flow paths is also described.

16 Claims, 7 Drawing Sheets

(56) References Cited

U.S. PATENT DOCUMENTS

| | | | |
|---|---|---|---|
| 7,261,092 B1 | 8/2007 | Oku et al. | |
| 9,308,490 B2 * | 4/2016 | Vandermeulen | F28F 1/02 |
| 9,732,649 B2 | 8/2017 | Hiltzik et al. | |
| 10,654,582 B2 * | 5/2020 | Rheaume | B01D 53/229 |
| 10,898,860 B2 * | 1/2021 | Kim | B01D 53/228 |
| 2002/0152889 A1 * | 10/2002 | Baker | B01D 71/32 |
| | | | 95/45 |
| 2003/0168403 A1 * | 9/2003 | Corcho-Sanchez | C12M 29/04 |
| | | | 210/631 |
| 2004/0226886 A1 * | 11/2004 | Hester | B01D 65/003 |
| | | | 210/649 |
| 2006/0112827 A1 * | 6/2006 | Okada | B01D 63/085 |
| | | | 96/9 |
| 2011/0266219 A1 * | 11/2011 | Meuleman | B01D 63/02 |
| | | | 210/640 |
| 2011/0311898 A1 * | 12/2011 | Yamauchi | H01M 8/0286 |
| | | | 429/480 |
| 2012/0111051 A1 * | 5/2012 | Kulkarni | B01D 53/229 |
| | | | 62/619 |
| 2012/0228213 A1 * | 9/2012 | Ishii | B01D 63/082 |
| | | | 210/490 |
| 2017/0258977 A1 * | 9/2017 | Miki | B01D 63/087 |
| 2018/0133644 A1 * | 5/2018 | Liu | B01D 53/226 |
| 2018/0272283 A1 * | 9/2018 | Rheaume | A62D 1/0092 |
| 2019/0047721 A1 * | 2/2019 | Rheaume | B01D 53/864 |
| 2020/0360853 A1 * | 11/2020 | Vaidya | B01D 53/226 |

\* cited by examiner

FIG. 11B though ambient temperatures are elevated, such as during summer months, when a vehicle is exposed to direct sunlight, and so forth. This phenomenon is known as diurnal breathing loss (DBL).

MEMBRANE MODULE FOR MITIGATING EVAPORATIVE FUEL EMISSIONS OF AUTOMOBILES

TECHNICAL FIELD

The present application relates to filters for the reduction of emissions of evaporated fuel in a vehicle.

BACKGROUND

The statements in this section merely provide background information related to the present disclosure and may not constitute prior art.

Emissions from sources such as internal combustion engines has been recognized as a pervasive source of air pollution. Therefore, both governments and entities in the private sector have prioritized a large-scale reduction in the quantity of emissions generated by vehicles. In particular, there has been a push to make vehicles more fuel efficient, as less fuel consumption means lower aggregate emissions. Initiatives encouraging or mandating the reduction of carbon dioxide from the combustion of fuel have also been proposed.

However, combustion of fuel during the active operation of a vehicle is only one potential source of pollution generated by vehicles. Motor vehicles can also produce hydrocarbon emissions as a result of the evaporation of fuel stored in the fuel tank, even while the vehicle is not in operation. This is of particular concern when ambient temperatures are elevated, such as during summer months, when a vehicle is exposed to direct sunlight, and so forth. This phenomenon is known as diurnal breathing loss (DBL).

Evaporative emissions of this nature have conventionally been controlled by mitigation systems that include a canister packed with a hydrocarbon adsorbent material, such as activated carbon, connected in line with the fuel tank. These canisters tend to capture hydrocarbons efficiently when emitted at high concentration from the fuel tank, but are less effective when the fuel vapors are present in lower quantity. For this reason, mitigation systems may include a second adsorbent capture element downstream of the canister as a way to capture the less concentrated hydrocarbons.

It has been a challenge to develop an evaporative emissions system that effectively reduces diurnal breathing loss.

The foregoing is intended merely to aid in the understanding of the background of the present disclosure, and is not intended to mean that the present disclosure falls within the purview of the related art that is already known to those skilled in the art.

SUMMARY

In one aspect, the present disclosure provides a filter assembly for reducing hydrocarbon emissions of a vehicle. The filter assembly includes a plurality of modules, each of which has a frame and a membrane disposed at least partially within the frame. Each of the frames of the plurality of modules are disposed adjacent to and in contact with the frame of at least one neighboring module. In this arrangement, the membranes define at least one feed channel and at least one sweep channel in the filter assembly.

In another aspect, the present disclosure relates to a filter assembly for reducing hydrocarbon emissions of a vehicle. The filter assembly may include at least one feed flow guide defining at least one feed channel formed therein, as well as at least one sweep flow guide defining at least one sweep channel formed therein. The filter assembly may include a plurality of membranes disposed between the at least one feed flow guide and at least one sweep flow guide. Each membrane having a first face and a second face opposite the first face, the first face being exposed to a feed flow channel, and the second face being exposed to a sweep flow channel. In one aspect, the feed flow guide and the sweep flow guide may each define a curved channel therein, the respective curved channels being aligned in the filter assembly in such a way as to create a counterflow across the membrane. In another aspect, the feed flow guide and the sweep flow guide may each define a plurality of substantially straight flow channels aligned parallel to one another within the body of the respective flow guide.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
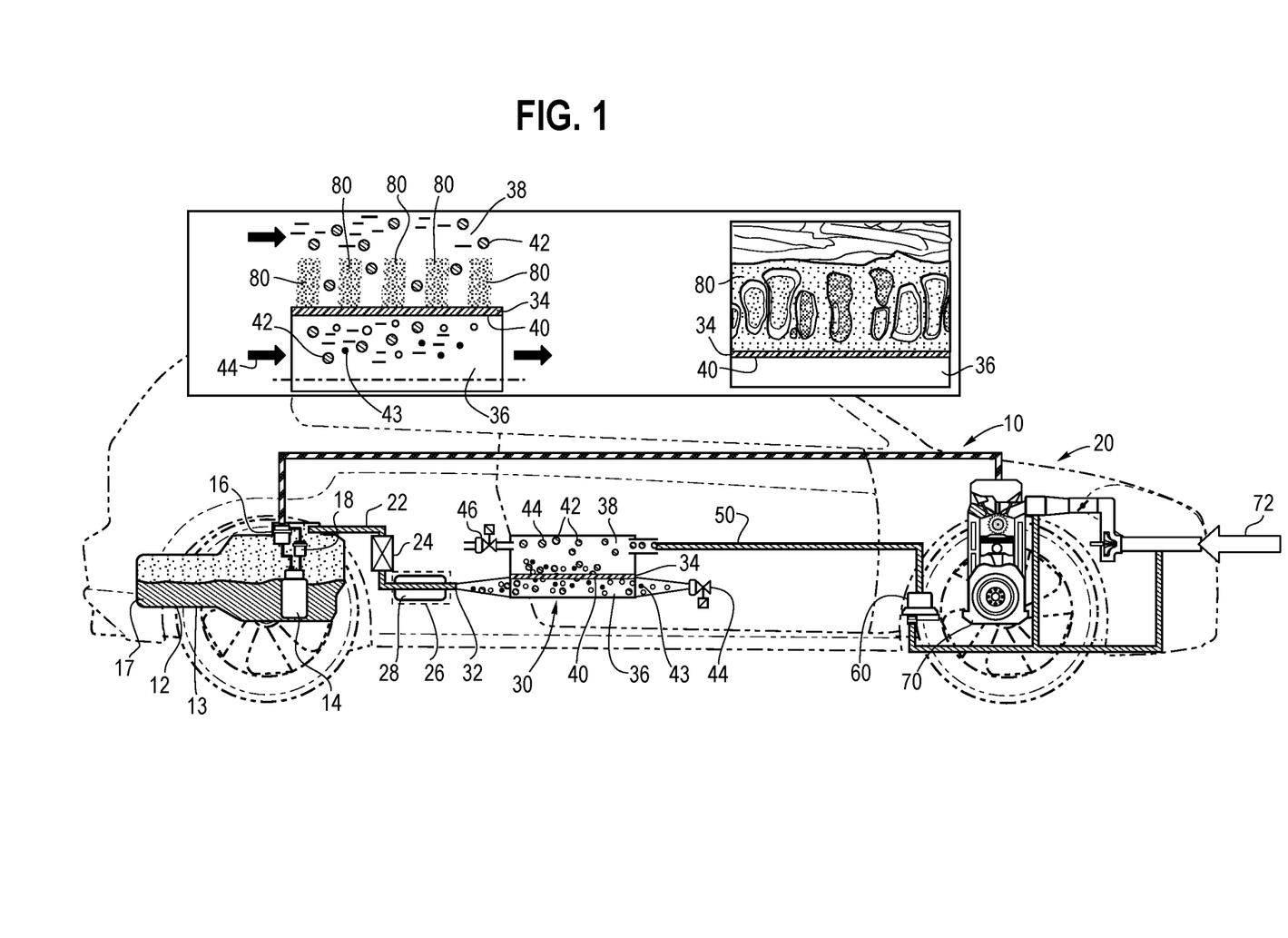
FIG. 1 is a schematic view of a fuel system of a vehicle including a filter assembly as disclosed herein.

FIG. 1 provides a schematic illustration of a portion of a fuel system 10 of a vehicle 20 including a filter assembly 30 constructed in accordance with the principles of the present disclosure. A fuel tank assembly 12, including a tank 13, pump 14, filter 16, and control 18, contains fuel 17 and is open to vent line 22, which includes a check and relief valve 24 allowing access to a chamber 26 containing an adsorbent material 28, such as activated charcoal. Fuel vapor that evaporates from the fuel tank 13 may pass into this chamber 26 to be temporarily stored by the adsorbent material 28. The chamber 26 containing the adsorbent material 28 leads through a filter entry port 32 into the filter assembly 30, which is described in more detail below.

The filter assembly 30 contains at least one filter membrane 34. The filter membrane 34 may be provided with at least one support 80 (see inset of FIG. 1), which in some aspects may be a porous support. In other aspects, the support may not be porous. In some forms, the support may be a polymer support, and may include one or more of polyetherimide (PEI), polyocylmethylsilozane (POMS), polydimethylsiloxane (PDMS), and other polymers. Each filter membrane 34 effectively divides the filter assembly 30 into two volumes 36 and 38; a pre-filtration volume 36, which is where the evaporated fuel enters, and which is bounded by the surface 40 of the filter membrane 34 that selectively adsorbs hydrocarbons; and a post-filtration volume 38, which generally contains hydrocarbons 42 that have passed through the filter membrane 34.

The pre-filtration volume 36 has an atmospheric access port 44 on an opposite side of the filter assembly 30 from the entry port 32, which allows inert atmospheric gases 43 (such as oxygen and nitrogen) to pass out of the vehicle 20 after the hydrocarbons 42 have been adsorbed through the filter membrane 34 from pre-filtration volume 36 to post-filtration volume 38.

Hydrocarbon-containing fuel vapor 44 passes through and out of the filter membrane 34 into the post-filtration volume 38, which is provided with an air intake port 46 that assists in propelling the hydrocarbons 42 out of the filter assembly 30 and through a line 50 to a purge valve 60. The purge valve 60 remains closed while the engine 70 is not in operation, and creates a vacuum such that when it is opened (for example, when the engine 70 is running), the fuel vapor is drawn into the engine 70 along with air 72. The filtered hydrocarbons are then consumed during vehicle operation.

Figure 2A:
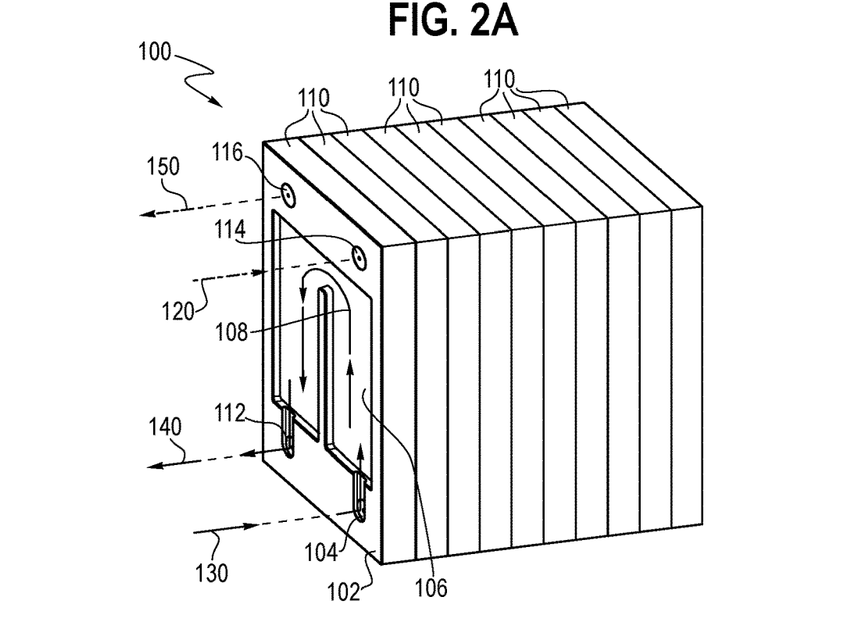
FIG. 2A is a perspective view of a modular filter assembly in accordance with one aspect of the present disclosure.

FIG. 2A illustrates one form of a filter assembly 100 as described in the present disclosure. The filter assembly 100 includes a plurality of filter modules 110. Each filter module 110 includes a frame 102 and a filter membrane 106 disposed within the frame 102. Each module 110 is aligned with a neighboring module.

In this form, the frames 102 of neighboring modules 110 are in contact with one another to define filter assembly 100. The frames 102 of these modules 110 are substantially rectangular in shape, and are each the same size, so that all four sides of the frame 102 of one module 110 align with all four respective sides of the neighboring module 110. Modules of other shapes (circles, other polygons) will be aligned in similar fashion.

The filter assembly 110 itself defines four ports 104, 112, 114, and 116. There are two inlet ports: the feed port 104, which allows entry of evaporated fuel 130 from the fuel tank (optionally via the adsorbent chamber, such as the activated charcoal canister) into the filter assembly 100, and a sweep port 114, which provides air 120 from the atmosphere to assist with filtration by creating a pressure differential across the membrane 106 (further details below.) The other two ports are outlet ports, including retentate port 112 which allows for ejection of unfiltered, inert gaseous components 140 from the vehicle, and a permeate port 116, which eventually leads filtered hydrocarbons 150 to the engine. A flow path 108 in communication with certain of these ports is defined in the filter assembly 100.

Figure 2B:
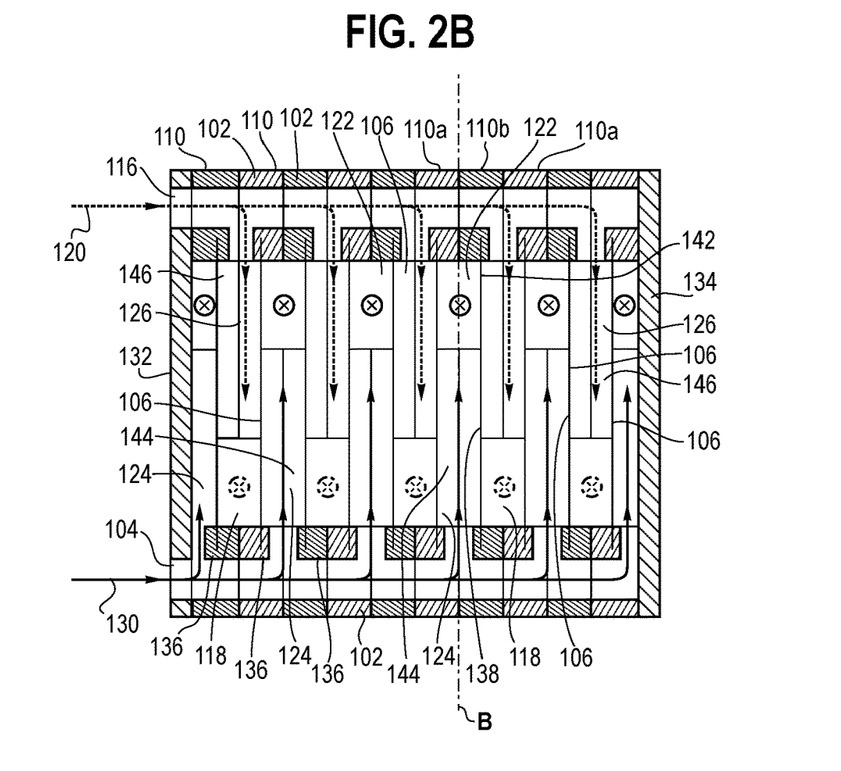
FIG. 2B is a cross-sectional view of the filter assembly as depicted in FIG. 2A.

FIG. 2B provides a cross-sectional view of the filter assembly 100 of FIG. 2A through a plane that contains the feed port 104 and sweep port 114. The feed port 104 opens into a plurality of feed channels 124 substantially orthogonal to the path of incoming fuel vapor 130, and the sweep port 116 similarly opens into a plurality of sweep channels 126 that run substantially perpendicular to the path of air 120 coming in through the sweep port 116.

The sweep channels 126 and the feed channels 124 are defined between the membranes 106 of neighboring filter modules 110. The membranes 106 may, in one aspect, by of an asymmetric construction, having an active layer and an inert support layer. The active layer may be disposed on a first face 138 of the membrane 106, and the support layer may be disposed on a second face 142 of the membrane 106. In such a design, the first face 138 of each membrane is exposed to the feed channels 124, so that hydrocarbons from the fuel vapor can adsorb onto the filter, and the inert second face 142 of the membrane bounds a portion of the sweep channels 126. Each module 110 in the example illustrated, then, provides a portion of a boundary for one sweep channel 126 and one feed channel 124. The channels 124 and 126 are defined by voids 144 and 146 within the space defined by each frame 102, on either side of the membrane 106; first voids 144 are bounded by the first face 138 of the membrane 106 and provide a portion of the volume of the feed channels 124. Likewise, second voids 146 are bounded by the second face 142 of the membrane 106 and provide a portion of the sweep channels 126. The membranes 106 are attached to the frames at contact points 136. The membrane 106 may be supported by a structure, such as a bar, in order to provide mechanical stability, helping the filter assembly 100 in general and the membrane 106 in particular keep their respective shapes. This webbing may be the same as, or different from, the support layer on the second face 142 of the membrane 106.

In order to facilitate this arrangement, neighboring modules may have the same construction, but when one module is rotated 180° relative to its neighbor about the center of the module, the channel structure as seen in FIG. 2B is defined. For instance, module 110a of FIG. 2B is rotated 180° relative to module. Then, the next module 110 is rotated 180° relative to module 110b, giving rise to an A-B-A-B—etc. pattern along the length of the assembly 100. This allows for the first faces 138 of neighboring modules 110 to face one another to define the feed channel 124, and second faces 142 to do the same in order to define sweep channels 126. This alignment allows for a counterflow to develop as air 120 flows in and proceeds in a first direction (downward, in FIG. 2B), while fuel vapor 130 flows through the feed port 104 and flows in the opposite direction (upward, in FIG. 2B). This counterflow results in a higher gradient of mean partial pressures relative to, for example, a construction having substantially parallel fluid flows. The counterflow causes a more equalized partial pressure gradient across the membrane as a whole, which increases separation efficiency over the module. Low partial pressure gradients toward the ends of the membranes are reduced or prevented by this design.

The inlet and outlet ports of the filter assembly 100 may be located in a single end of the assembly 100, as illustrated in FIG. 2A. In another aspect, the inlet and outlet ports may be provided on different sides of the assembly 100. For example, in FIG. 2A, the feed port 104 is defined through the same side of filter assembly 100 as sweep port 114. However, in another aspect, the feed port 104 may be defined in the same position as in FIG. 2A, but the sweep port 114 may instead be defined through the opposite side of the filter assembly 100 (the right side of the drawing, as shown.) An assembly constructed in this way will have a different counterflow profile than the assembly 100 illustrated in FIGS. 2A and 2B.

In the illustrated form, the sweep channels 126 do not run the entire length of the membrane 106, but define a curve at lower blocks 118, whereupon the flow curves about 180° as best seen in FIG. 2A. The feed channels 124 define similar curves at upper blocks 122. In aspects that differ from the illustrated example, the module may define channels that extend from one end of the frame 102 to the opposite end of the frame.

The filter assembly 100 may optionally have closed ends, provided by first end cap 132 and second end cap 134 as shown in FIG. 2B. In the illustrated aspect, the end caps 132 and 134 have different constructions. The second end cap 134 is effectively the same size as a frame, and is simply a closed block that caps the filter assembly 100. First end cap 132 is similarly closed, except that ports 104, 112, 114, and 116 are formed through its body. In an aspect in which the inlet/outlet ports are provided on opposing ends of the filter assembly 100, the end caps 132 and 134 can have similar or identical structures to one another.

In one aspect, a filter membrane 106 as described herein may operate with a "solution-diffusion" mechanism. Molecules of the fuel vapor that enter the filter assembly 100 (the feed) will be adsorbed onto the surface of the first face 138 of the membrane 106, which in one variation may include, or may be made of, silicone. The molecules will then travel through the membrane 106 through micro-channels until they reach the opposite site of the membrane 106, at which point they will desorb away from the surface to become the permeate.

The membrane 106 may be made of materials that provide better adsorption for larger molecules; for example, a hydrocarbon such as octane will be more readily adsorbed than a smaller hydrocarbon or an octane breakdown product, such as propane or methane, and will be better adsorbed than atmospheric gases like oxygen and nitrogen. The polarity of the molecule may also affect the degree to which adsorption takes place.

A pressure differential across the filter membrane 106, in part, may drive the molecules to pass through the membrane 106. As the pressure differential increases, so does the rate of flow across the membrane 106.

The membrane 106 is bonded to the frame 102 with which it forms a module 110. In one aspect, the membrane 106 may be formed as a precursor material injected within the frame 102. In one form, the frame 102 may be a fuel-resistant plastic frame.

The filter assembly as disclosed herein is of modular construction. As shown in FIGS. 2A and 2B, the number of modules 110 in the filter assembly 100 is ten. However, any number of modules 110 may be connected in series in order to account for factors that include, but are not limited to, the volume of the fuel tank, the evaporation characteristics of the fuel, the volume in the vehicle available for filter assembly, and so forth.

The modules 110 are aligned and then fixed together to form the filter assembly 100. In one aspect, the modules 110 may be screwed together. In another aspect, the frames 102 may be shaped to form a snap connection to the neighboring fames. Both of these connections allow for the simple removal and replacement of modules 110 that become defective. When connected by a screw or snap connection, there may be provided a sealing mechanism around the modules 110 to assist in keeping the filter assembly 100 airtight. In other aspects, the modules 110 may be glued together, or they may be welded (such as by ultrasound welding), and the optional sealing component may not be employed.

Figure 3:
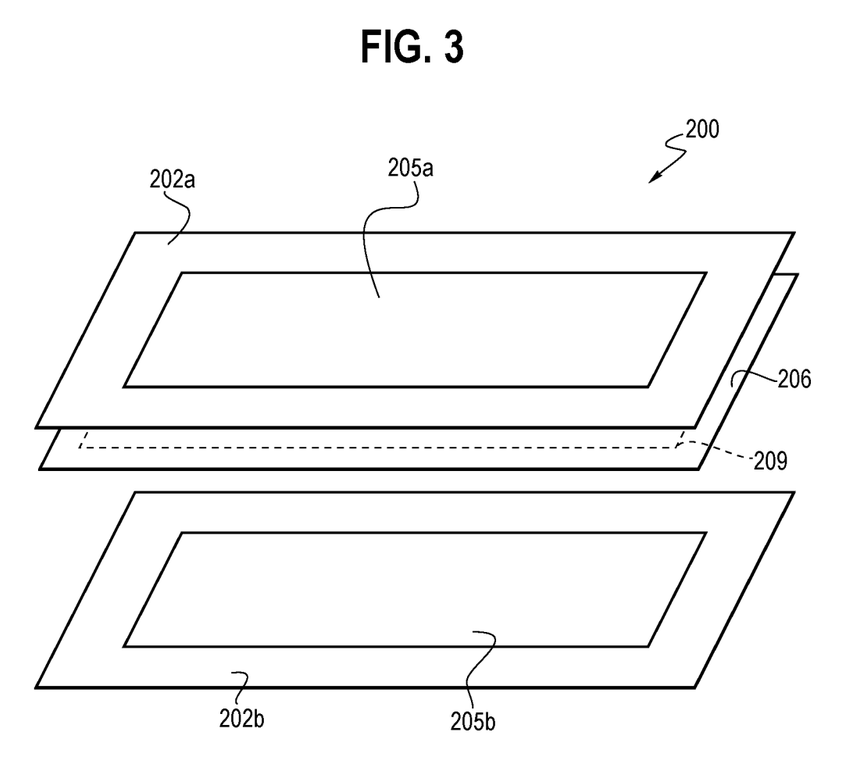
FIG. 3 is an exploded view illustrating the components of a module of the filter assembly of the present disclosure.

A variation on the construction is illustrated in FIG. 3. In this aspect, the frame 202 is defined by two preconstructed frame halves 202a and 202b. Rather than forming the membrane by injection, in this example the membrane 206 is preformed and the two halves 202a and 202b of the frame 202 come together to "sandwich" the membrane 206 therebetween to define module 200. The frame halves 202a and 202b are constructed with spaces (205a and 205b, respectively) to allow the membrane 206 to be exposed to the channel that it will form in the assembly. The membrane 206 may be sized such that an edge 209 is clamped between the two frame halves 202a and 202b. The membrane 206 may be held in a form-fitting manner in which the edges 209 are, for example, folded over, or a piping is introduced.

Figure 4:
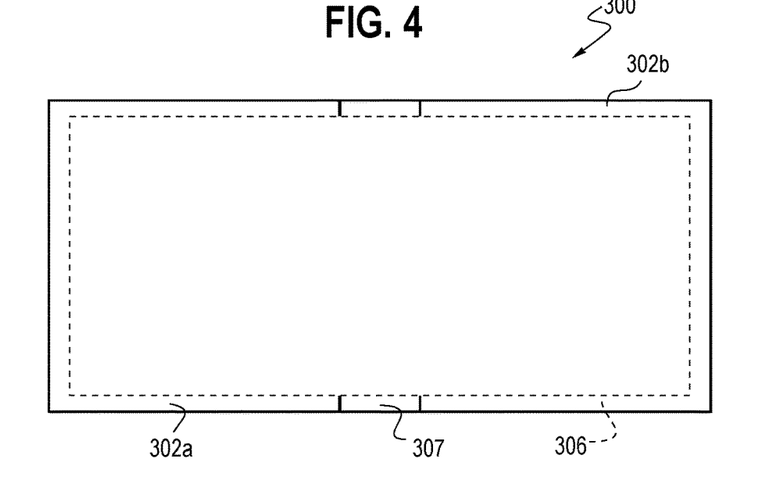
FIG. 4 is a top view of a hinged filter module according to an aspect of the present disclosure.
Figure 5:
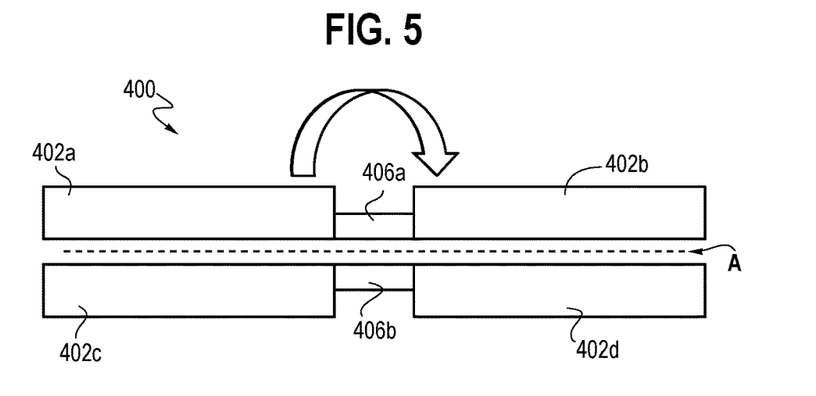
FIG. 5 is a side view of a hinged filter module according to another aspect of the present disclosure.

In another aspect, as shown in FIGS. 4 and 5, a module 300 may be constructed that has two frame portions 302a and 302b, which are connected to one another only by membrane 306, which defines a film hinge 307 between the frame portions 302a and 302b. In this construction, several modules may be produced in a single step. The frame portions 302a and 302b may have a snap mechanism, so that after demolding the newly constructed modules 300, they may be stacked and secured, in some instances defining the meandering flow paths as described previously. As the membrane 306 defines the film hinge, it can be cut when closing the casting tool, and the membrane 306 can be processed directly as a band, thereby eliminating an upstream cutting step.

Figure 6:
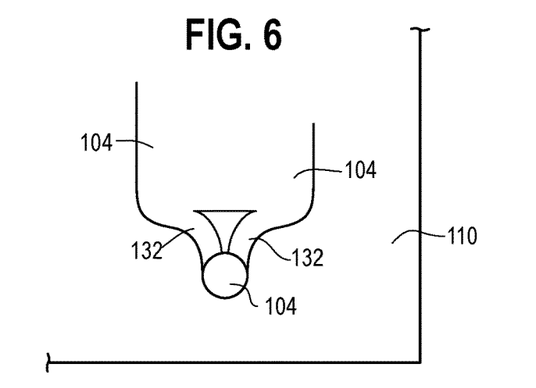
FIG. 6 is a close-up view of a variation on an entry port of the filter assembly of the present disclosure.

FIG. 6 provides an optional construction of a feed port 104. In this aspect, the feed port 104 splits into two narrow channels 132 in order to introduce a flow divider, which can assist in controlling the fluid flow. This may aid in making sweeping of the membrane surface more uniform.

Figure 7A:
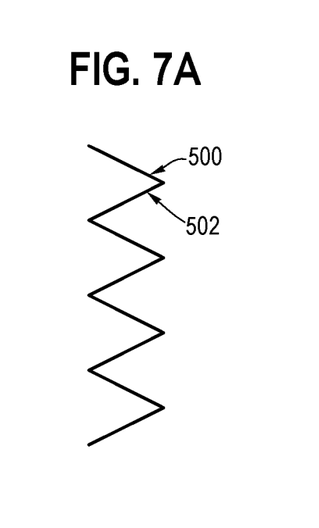
FIG. 7A and FIG. 7B illustrate folding patterns for a membrane that may be used in a filter assembly as disclosed herein.
Figure 7B:
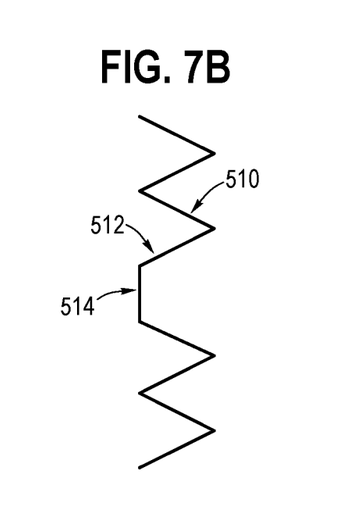

A number of variations on the shape of the membranes and/or frames as used in a filter assembly of the fluid disclosure are possible. As shown in FIG. 7A, if an increased surface area of a membrane 500 is desirable, a series of pleats 502, or folds, curves, bulges, creases, or bends may be introduced out of the original plane of the membrane in order to fill a frame with an increased membrane surface area. The folding may be done as in FIG. 7B, in which membrane 510 includes a series of smaller folds 512 and an unfolded area of stabilization 514 to assist in keeping the membrane operational. The area of stabilization 514 may be supported by a mechanical structure, such as a bar, to help the membrane 510 keep its shape. In some instances, a gentle curve may be sufficient to increase the surface area of the membrane an effective amount.

Figure 8:
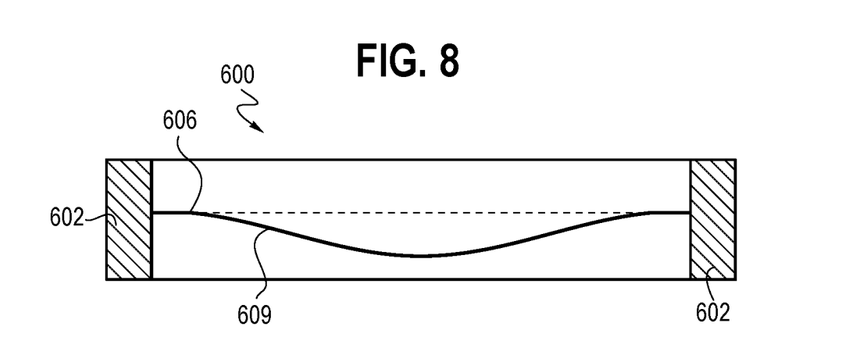
FIG. 8 is a cross-sectional view of a filter module having a curved membrane as disclosed herein.
Figure 9:
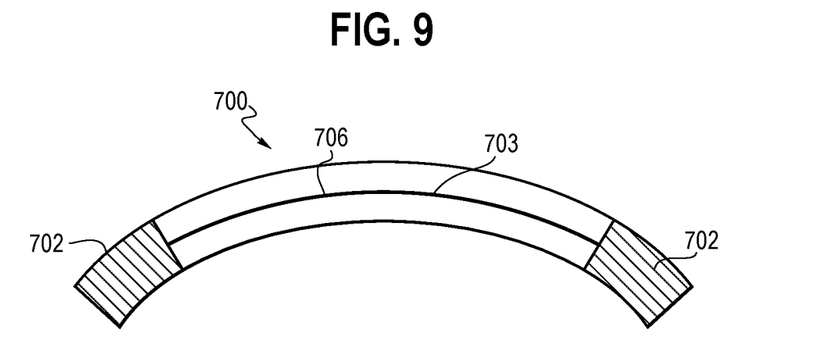
FIG. 9 is a cross-sectional view of a filter module having a curved frame as disclosed herein.

In FIG. 8, a module 600 with membrane 606 is shown. The membrane 606 is contained within frame 602 and includes a curve 609 so that the membrane takes on a more rounded or "spherical" form. FIG. 9, likewise, illustrates a module 700 that not only has a curved membrane 706, but also a frame 702 having a curve 703. This construction may be suitable for vehicles that have more constrained spaces for a filter assembly.

Figure 10A:
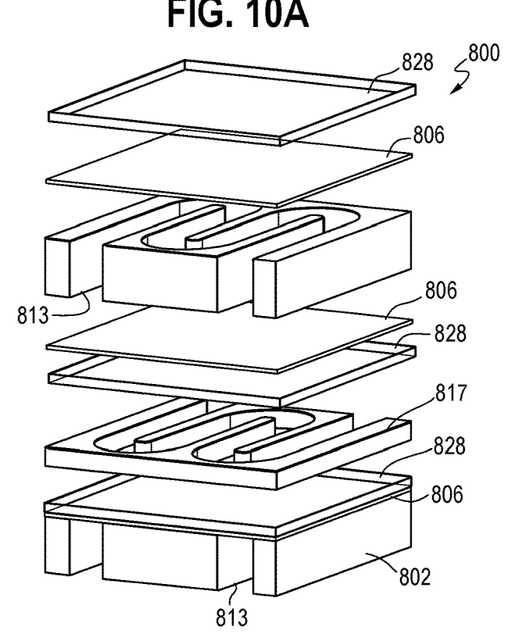
FIG. 10A is an exploded view of a portion of a filter assembly according to another aspect of the present disclosure.

In another variation, premade flow guides may be employed to create the fluid flow paths for a modular filter assembly. FIG. 10A shows a portion of a filter assembly 800 that includes a fuel vapor flow guide 813 and a sweep flow guide 817. The fuel vapor flow guide 813 is constructed to define a meandering path therethrough, which is a feed channel. The sweep flow guide 817 likewise includes a meandering sweep channel. These curved channels allow for a longer flow path and thus longer residence time of fuel vapor below the guide path. The flow guides 813? and 817 function as frames. In the filter assembly 800, membranes including active membranes 806 and supports 828 are embedded between flow guides 813 and 817.

Figure 10B:
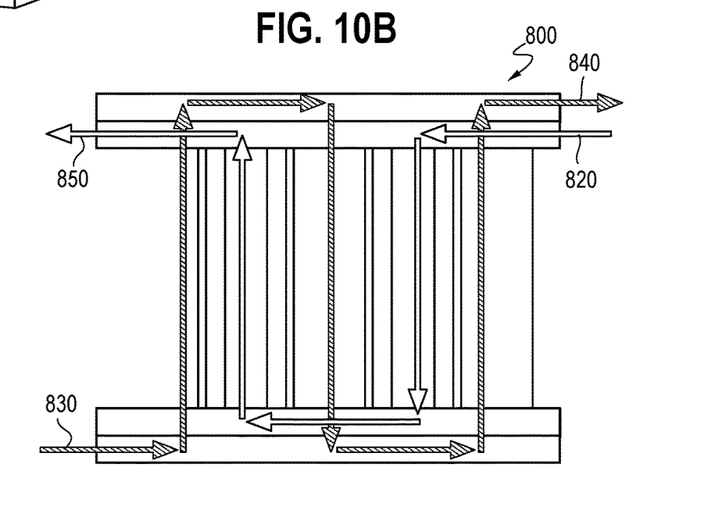
FIG. 10B is a schematic flow diagram of flow paths in the filter assembly as illustrated in FIG. 10A.
Figure 10C:
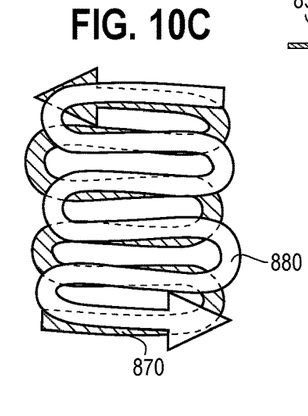
FIG. 10C is a view of counterflow generated across a membrane in the filter assembly as illustrated in FIG. 10A.

As can be seen in FIG. 10B, the construction and arrangement of these flow guides allows for a flow pattern in which air 820 and vapor fuel 830 flow in a counterflow pattern, shown schematically as curved paths 870 and 880 of FIG. 10C, resulting in a retentate 840 and permeate 850 as described previously.

Figure 11A:
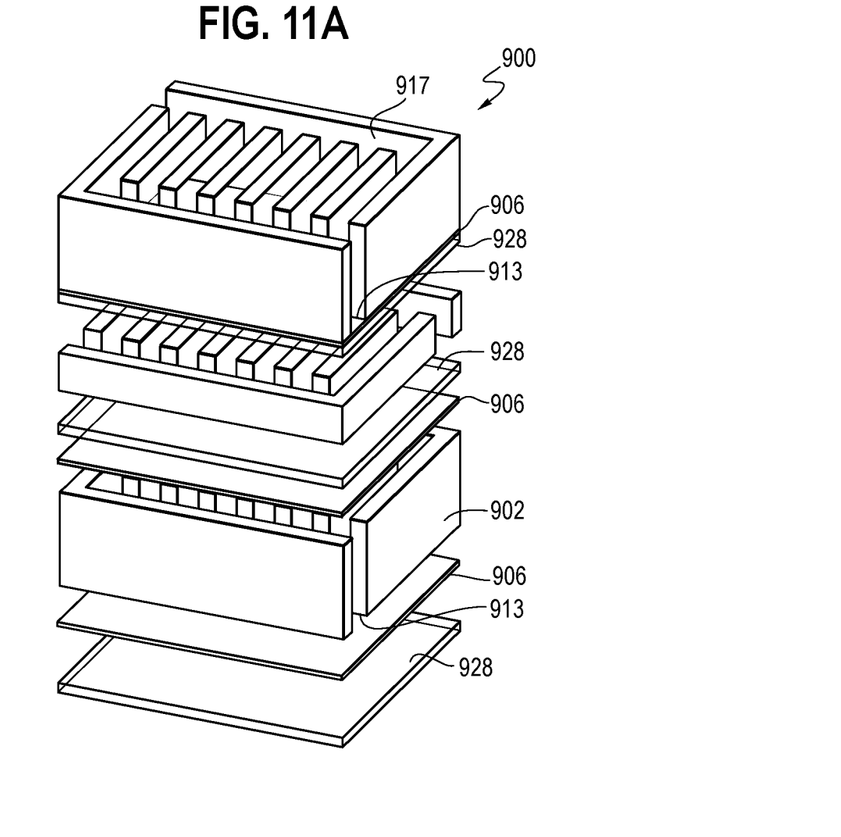
FIG. 11A is an exploded view of a portion of another filter assembly according to another aspect of the present disclosure.
Figure 11B:
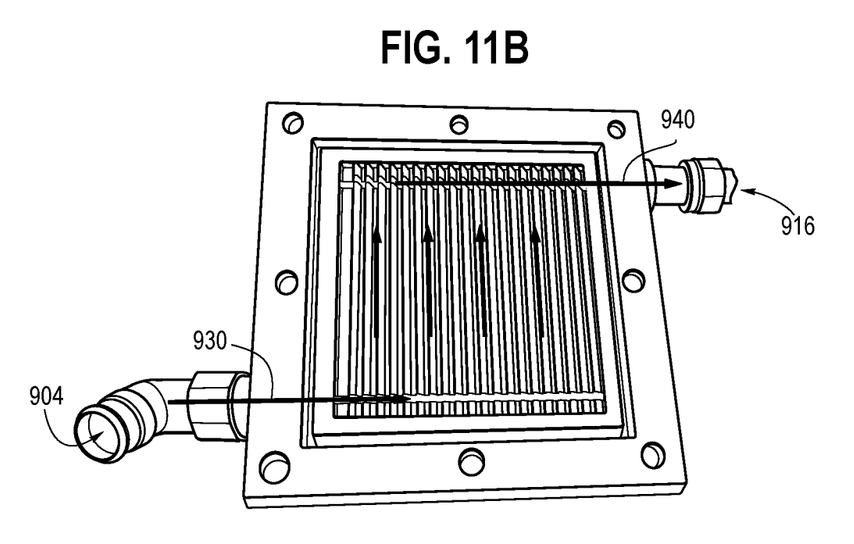
FIG. 11B is a perspective view of a filter assembly similar to that illustrated in FIG. 11A.

FIG. 11A illustrates another aspect of the present disclosure similar to that of FIG. 10, but in this aspect, as can be seen in FIG. 11A parallel flow channels 913 rather than meandering flow channels are defined in the flow guides 917. In this aspect, a series of membranes 906 are layered with parallel flow guides 917 between them. The parallel construction allows for a lower pressure drop across the membranes 906 than in the aspect with the meandering flow paths. FIG. 11B shows a feed port 904 that allows fuel vapor 930 to enter the assembly, flow through the parallel paths 913, and emerge through permeate port 916 as filtered permeate 940.

Although aspects of the present disclosure have been described for illustrative purposes, those skilled in the art will appreciate that various modifications, additions and substitutions are possible, without departing from the scope and spirit of the disclosure.

What is claimed is:

1. A filter assembly for reducing hydrocarbon emissions of a vehicle, the filter assembly comprising:
   a plurality of modules each comprising a frame and a membrane disposed at least partially within the frame, each of the membranes having a first and second side with an active layer disposed on the first side and an inert support layer disposed on the second side;
   each of the frames of the plurality of modules being disposed adjacent to and in contact with the frame of at least one neighboring module with the membranes of neighboring modules having the active layer facing each other to define at least one feed channel and the inert support layer facing each other to define at least one sweep channel in the filter assembly.

2. The filter assembly of claim 1, further comprising a feed port in fluid communication with the feed channel of each of the plurality of modules.

3. The filter assembly of claim 1, further comprising a sweep port in fluid communication with the sweep channel of each of the plurality of modules.

4. The filter assembly of claim 1, wherein each module comprises a plurality of voids therein.

5. The filter assembly of claim 1, wherein at least one membrane comprises a silicone layer disposed on a support layer, the silicone layer defining a boundary of the feed channel.

6. The filter assembly of claim 1, wherein each frame is rectangular in shape.

7. The filter assembly of claim 1, wherein each of the frames defines a curved shape.

8. The filter assembly of claim 1, wherein at least one of the membranes defines a curved shape.

9. The filter assembly of claim 1, wherein at least one of the plurality of membranes defines a pleat, a fold, a crease, a bend, or a bulge.

10. A filter assembly for reducing hydrocarbon emissions of a vehicle, the filter assembly comprising:
    at least one feed flow guide defining at least one feed channel formed therein,
    at least one sweep flow guide defining at least one sweep channel formed therein, and
    a plurality of membranes disposed between the at least one feed flow guide and at least one sweep flow guide, the at least one feed flow guide and the at least one sweep flow guide functioning as frames for the plurality of membranes; each membrane having a first face with an active layer and a second face with an inert support layer opposite the first face, the first face being exposed to a feed flow channel, and the second face being exposed to a sweep flow channel.

11. The filter assembly of claim 10, wherein a membrane of the plurality of membranes comprises a silicone layer disposed on a support layer, the silicone layer including the first face, and the support layer including the second face.

12. The filter assembly of claim 10, wherein the feed flow channel defines a curved path through the feed flow guide.

13. The filter assembly of claim 12, wherein the feed flow channel defines a plurality of curves.

14. The filter assembly of claim 12, wherein the sweep flow channel defines a curved path through the sweep flow guide, the sweep flow channel having a shape that differs from that of the feed flow channel such that fluid flow through the sweep flow channel and the feed flow channel causes a counterflow over at least a portion of a membrane.

15. The filter assembly of claim 10, wherein the feed flow guide defines a plurality of feed flow channels parallel to one another.

16. The filter assembly of claim 15, wherein the sweep flow guide defines a plurality of sweep flow channels parallel to one another.

* * * * *